United States Patent [19]

Smith

[11] Patent Number: 5,760,212

[45] Date of Patent: Jun. 2, 1998

[54] TEMPORARY WET STRENGTH ADDITIVES

[76] Inventor: David Jay Smith, The Procter & Gamble Company, Winton Hill Technical Center 6100 Center Hill Ave., Cincinnati, Ohio 45224

[21] Appl. No.: 623,293

[22] Filed: Mar. 28, 1996

[51] Int. Cl.$^6$ .................. G08B 37/00; G08B 37/18; G08B 33/08; G07H 1/00

[52] U.S. Cl. .................. 536/123.1; 536/104; 536/105; 536/114; 536/123; 536/124; 514/54; 514/57

[58] Field of Search .................. 536/114, 123, 536/123.1, 124, 104, 105; 514/54, 57

[56] References Cited

U.S. PATENT DOCUMENTS

| | | | |
|---|---|---|---|
| 2,685,508 | 8/1954 | Spear | 92/21 |
| 2,988,455 | 6/1961 | Rosenberg et al. | 536/2 |
| 3,084,057 | 4/1963 | Jordan | 106/205 |
| 3,138,473 | 6/1964 | Floyd et al. | 106/205 |
| 3,205,125 | 9/1965 | Opie et al. | 162/178 |
| 3,225,028 | 12/1965 | Nordgren | 260/209 |
| 3,236,832 | 2/1966 | Opie et al. | 260/209 |
| 3,239,500 | 3/1966 | Keen et al. | 260/209 |
| 3,297,604 | 1/1967 | Germino | 260/17.4 |
| 3,683,917 | 8/1972 | Comerford | 128/287 |
| 3,691,153 | 9/1972 | Vemuri | 536/114 |
| 3,868,955 | 3/1975 | Steiger et al. | 604/359 |
| 3,873,614 | 3/1975 | Lamberti et al. | 536/105 |
| 4,022,965 | 5/1977 | Goheen et al. | 536/56 |
| 4,129,722 | 12/1978 | Iovine et al. | 536/43 |
| 4,269,975 | 5/1981 | Rutenberg et al. | 536/114 |
| 4,557,801 | 12/1985 | Avis | 162/157 |
| 4,683,298 | 7/1987 | Yalpani | 536/45 |
| 4,959,466 | 9/1990 | White | 536/119 |
| 5,338,406 | 8/1994 | Smith | 162/168.2 |
| 5,338,407 | 8/1994 | Dasgupta | 162/168.2 |

FOREIGN PATENT DOCUMENTS

| | | | |
|---|---|---|---|
| 0 175 13 A2 | 3/1986 | European Pat. Off. | C08B 31/12 |
| 63-035603 | 2/1988 | Japan | C08B 11/04 |
| 428 420 | 6/1967 | Switzerland . | |
| 912279 | 12/1962 | United Kingdom . | |
| 928591 | 6/1963 | United Kingdom . | |
| 939389 | 10/1963 | United Kingdom . | |
| 998521 | 7/1965 | United Kingdom . | |
| 1056711 | 1/1967 | United Kingdom . | |
| 1554002 | 10/1979 | United Kingdom | A41B 13/02 |
| WO 95/25847 | 9/1995 | WIPO | D21H 17/24 |
| WO 95/26441 | 10/1995 | WIPO | D21H 27/38 |

OTHER PUBLICATIONS

Neogi, A.N. et al., "Wet Strength Improvement via Fiber Surface Modification", Tappi, vol. 63, No. 8, pp. 86–88, (Aug. 1980).

Young, R.A., "Bonding of Oxidized Cellulose Fibers And Interaction with Wet Strength Agents", vol. 10, No. 2, pp. 112–119 (Summer 1978).

Angibeaud, P. et al., "Cellulose and Starch Reactivity with Ozone", Cellulose and its Derivates, Chapter 13, pp. 161–171 (1985).

Swanson, "Conversion of Mannogalactan Mucilages in Aqueous Borax Solutions for Use as Tub-sizing and Coating Adhesives", *TAPPI*, vol. 33, No. 2, pp. 77–81, (1950).

Haug, "Purification and Characterization of Purified Fraction", *TAPPI*, vol. 36, No. 1, pp. 47–51 (1953).

Haug, "Guar Mannogalactan Studies. II. Effect of Certain Variables, Including Borax, on the Rate of Oxidation of the Purified Mucilage", *TAPPI*, vol. 36, No. , pp. 53–58 (1953).

Opie, "Dialdehyde Galactomannan Gums as Wet End Wet and Dry Strength Additives", *TAPPI*, vol. 47, No. 8, pp. 504–507 (1964).

Yiannos, "Gums –Vegetable", 8–7, *Handbook of Pulp and Paper Technology*, (2nd Ed., Britt, Van Nostrand Reinhold Co.), pp. 650–654, (1964).

Browning, "Wood Chemistry", 1–1, *Handbook of Pulp and Paper Technology*, (2nd Ed., Britt, Van Nostrand Reinhold Co.), pp. 3–12, (1964).

Hui et al., "Some Properties of Galactomannans", *TAPPI*, vol. 47, No. 1, pp. 39–42, (1964).

U.S. application No. 08/623,309, Smith et al., filed Mar. 28, 1996.

U.S. application No. 08/624,765, Headlam et al., filed Mar. 28, 1996.

*Primary Examiner*—John Kight
*Assistant Examiner*—Everett White
*Attorney, Agent, or Firm*—Loretta J. Henderson; Carl J. Roof; E. Kelly Linman

[57] ABSTRACT

Compounds comprising the oxidation product of a polysaccharide in which the hydroxyl groups in at least a portion of the repeating units of the polysaccharide are cis-hydroxyl groups, the oxidation product comprising aldehyde groups, are disclosed. The compounds are useful for imparting temporary wet strength to paper products. Preferred polysaccharides for use in the invention include guar gum and locust bean gum.

14 Claims, No Drawings

TEMPORARY WET STRENGTH ADDITIVES

FIELD OF THE INVENTION

The present invention relates to compounds that are useful for imparting temporary wet strength to paper products, e.g., toilet tissue, absorbent paper towels, and the like.

BACKGROUND OF THE INVENTION

Wet strength is a desirable attribute of many disposable paper products that come into contact with water in use, such as napkins, paper towels, household tissues, disposable hospital wear, etc. In particular, it is often desirable that such paper products have sufficient wet strength to enable their use in the moistened or wet condition. For example, moistened tissue or towel may be used for body or other cleaning. Unfortunately, an untreated cellulose fiber assemblage will typically lose 95% to 97% of its strength when saturated with water such that it cannot usually be used in the moistened or wet condition.

As recognized in the pertinent literature relating to wet strength of paper products, such as Stannet, "Mechanisms of Wet Strength Development in Paper," Surface Coatings Related Paper Wood symposium, pp. 289–299 (1967) and Westfelt, "Chemistry of Paper Wet Strength I. A Survey of "Mechanisms of Wet Strength Development," Cellulose and Chemistry and Technology, Vol. 13, pp. 813–825 (1979), paper products develop dry strength in part due to interfiber hydrogen bonding. When the paper product is wetted, water disrupts the hydrogen bonds and, as a consequence, lowers the strength of the paper product. Historically, wet strength of paper products has been increased primarily by two approaches. One approach is to prevent water from reaching and disrupting the hydrogen bonds, for example, by coating the paper product. Another approach is to incorporate additives in the paper product which contribute toward the formation of interfiber bonds which are not broken or, for temporary wet strength, which resist being broken, by water. The second approach is commonly the technique of choice, especially for tissue products. In this latter approach, a water soluble wet strength resin may be added to the pulp, generally before the paper product is formed (wet-end addition). The resin generally contains cationic functionalities so that it can be easily retained by the cellulose fibers, which are naturally anionic.

A number of resins have been used or disclosed as being particularly useful for providing wet strength to paper products. Certain of these wet strength additives have resulted in paper products with permanent wet strength, i.e., paper which when placed in an aqueous medium retains a substantial portion of its initial wet strength over time. Exemplary resins of this type include urea-formaldehyde resins, melamine-formaldehyde resins and polyamide-epichlorohydrin resins. Such resins have limited wet strength decay.

Permanent wet strength in paper products is often an unnecessary and undesirable property. Paper products such as toilet tissues, etc., are generally disposed of after brief periods of use into septic systems and the like. Clogging of these systems can result if the paper product permanently retains its hydrolysis-resistant strength properties. Therefore, manufacturers have more recently added temporary wet strength additives to paper products for which wet strength is sufficient for the intended use, but which then decays upon soaking in water. Decay of the wet strength facilitates flow of the paper product through septic systems. Numerous approaches for providing paper products claimed as having good initial wet strength which decays significantly over time have been suggested.

For example, various approaches suggested to achieve temporary wet strength are described in U.S. Pat. No. 3,556,932, Coscia et al., issued Jan. 19, 1971; U.S. Pat. No. 3,740,391, Williams et al., issued Jun. 19, 1973; U.S. Pat. No. 4,605,702, Guerro et al., issued Aug. 12, 1986; U.S. Pat. No. 3,096,228, Day et al., issued Jul. 2, 1983; and U.S. Pat. No. 4,675,394, Solarek, et al., issued Jun. 23, 1987. Wet strength resins are also disclosed in U.S. Pat. No. 3,410,828, Kekish, issued Nov. 12, 1968 and its parent, U.S. Pat. No. 3,317,370, Kekish, issued May 2, 1967.

Wet strength development of paper products of certain guar gum derivatives has also been described. For example, periodate oxidation of guar gum is described in British Patent No. 939,389; U.S. Pat. Nos. 3,205,125; 3,236,832; and 3,239,500; and in TAPPI Vol. 47, pp. 504–end (1964).

In addition, hypochlorous acid oxidation of guar gum in the presence of borax, at a pH of 10–11, is described in TAPPI Vol. 36, pp. 53–end. Under such conditions, carboxylic acids would be formed, rather than aldehydes.

While the art has provided a variety of paper products having initial wet strength, none has provided paper products in the manner of the present invention. It has now been found that certain polysaccharides can be oxidized in the presence of ozone to form a polymer that imparts high levels of temporary wet strength to paper products relative to that imparted by polysaccharides that have been oxidized without ozone. In particular, the polysaccharides oxidized by ozone provide significantly higher levels of temporary initial wet strength than the same polysaccharide that has been oxidized by periodate.

It is an object of this invention to provide paper products, including tissue paper products such as toilet tissue, that have high levels of initial wet strength and which retain sufficient strength during the period of intended use, but which also facilitate wet strength decay such that very low strength levels are attained subsequent to the period of intended use. Another object of the present invention is to provide paper products having a combination of an initial wet strength sufficient for use of the paper product for body cleaning in the moistened condition, a rate of wet strength decay sufficient for a flushable product and a ratio of dry strength to wet strength that provides an acceptable level of softness. It is a further object of the present invention to provide paper products having an initial total wet tensile strength of at least 120 g/inch and a 30 minute total wet tensile strength of not more than 40 g/inch.

It has now been found that certain polysaccharides can be oxidized with ozone to form an aldehyde-functionalized polysaccharide (hereafter alternatively referred to as "aldehyde polymer", which aldehyde polymer is useful for providing temporary wet tensile strength to paper products. The aldehyde polymer of the present invention provides initial wet tensile strengths that are higher than those provided by oxidation of the polysaccharide by agents other than ozone, or by the ozone oxidation of other polysaccharides.

SUMMARY OF THE INVENTION

The present invention relates to temporary wet strength additives. The additive comprises the ozone oxidation product of a polysaccharide in which the hydroxyl groups in at least a portion of the repeating units of the polysaccharide are cis-hydroxyl groups, for example, guar gum. The oxidation product is an aldehyde functionalized polysaccharide.

The present invention also relates to paper products obtained from the combination of cellulosic fibers, the aldehyde functionalized polysaccharide, and optionally other papermaking materials. The present invention also relates to methods of making the aldehyde functionalized polysaccharide and paper products.

DETAILED DESCRIPTION OF PREFERRED EMBODIMENT(S)

The aldehyde functionalized polysaccharide can be formed by the ozone oxidation of certain polysaccharides to form an aldehyde groups on the polysaccharide molecule.

Suitable polysaccharides for use in the present invention include polysaccharides in which the hydroxyl groups in at least a portion of the repeating units of the polysaccharide are cis-hydroxyl groups. Without intending to be bound or limited by theory, it is believed that the cis-hydroxyl groups are required for the obtaining aldehyde groups in the polysaccharide molecule. Suitable polysaccharides having the cis-hydroxyl groups include those derived from one or more sugars selected from the group consisting of mannose, galactose, altrose, altrose, gulose, talose, ribose, and lyxose. Economically preferred polysaccharides of this type are derived from mannose, galactose or both. Thus, economically preferred polysaccharides include galactomannan gums, e.g., guar gum and locust bean gum. Mixtures of polysaccharides may be used.

The polysaccharide may contain sugars other than those specifically mentioned. The sugar content of the polysaccharide can be determined by hydrolysis of the polysaccharide to the constituent sugars by known methods with subsequent qualitative and quantitative analysis of the hydrolyzate by separation techniques such as paper, thin-layer, or gas-liquid chromatography.

The polysaccharides may be neutral or may possess an electronic charge, e.g., an ionic charge. Thus, anionic and cationic polysaccharides are suitable for use herein. However, the polymer should be selected such that it will not result in excessive electrostatic repulsion between the fibers and the polymer. Preferably, the polysaccharide or mixture of polysaccharides is electronically neutral. Thus, each of the polysaccharides used in the invention may be neutral. Alternatively, a charge balanced mixture of polysaccharides may be used. By "charge balanced mixture" of polysaccharides, it is meant that the total amounts of each of the electronically charged polysaccharides in a polysaccharide mixture are selected such that the mixture is essentially neutral.

A neutral polysaccharide or a charge balanced mixture of polysaccharides may provide a higher initial wet strength than an electronically charged polysaccharide or polysaccharide mixture. For example, in a passive drainage environment such as encountered in the preparation of handsheets, a combination of cationic or anionic polysaccharide with the polyaldehyde polymer tends to provide less initial wet strength than a comparable combination of a neutral polysaccharide or charge balanced polysaccharide mixture with the polyaldehyde polymer. In a turbulent drainage environment such as encountered on commercial paper making equipment, a charge balanced mixture of polysaccharides tends to provide the highest initial wet strengths. Without intending to be bound by theory, it is believed that the aldehyde functionalized polymer derived from a charged polysaccharide more readily and/or strongly bonds to the fibers to thereby provide higher initial wet strengths relative to a polymer derived from a neutral, cationic or anionic polysaccharide. As will be appreciated by the artisan having ordinary skill, various intermediate combinations of neutral and charged polysaccharides may provide intermediate levels of initial wet strength.

The initial wet tensile strength tends to increase with the molecular weight of the polysaccharide. Therefore, for high initial wet strength, it is generally preferred to use polysaccharides having a relatively high molecular weight. Electronically charged polysaccharides tend to have lower molecular weights than the corresponding neutral polysaccharide from which they are produced, such that the neutral polysaccharides may provide higher initial wet tensile strengths, if each polymer has comparable retention, especially in a passive drainage environment such as handsheet formation.

Polysaccharides that are suitable for use herein are commercially available from Aqualon, a division of Hercules Incorporated of Wilmington, Delaware, under the trade names Galactosol and Supercol (both neutral guar gums), and the anionic, cationic, and amphoteric guar gums derived from them. Neutral and charged guar gums are also commercially available from other manufacturers.

The polysaccharide is oxidized to form aldehyde groups on the polysaccharide molecule. The oxidation is generally performed by forming a solution of the polysaccharide in a liquid medium and contacting the polysaccharide in the solution with ozone under conditions to cause oxidation. Contact of the polysaccharide and the oxidizing agent is preferably assisted by the use of an agitation means, e.g., a magnetic or mechanical stiffer.

The solution of the polysaccharide is formed by at least substantially dissolving the polysaccharide in a liquid medium comprising one or more suitable solvents. As used herein, reference to the phrase "substantially dissolved," "substantially dissolving" and the like refers to the dissolution, dispersion, swelling, hydration and the like admixture of a material in a liquid medium (e.g., water). The mixture typically forms a generally uniform liquid mixture having, to the naked eye, one physical phase.

The amount of the liquid medium and the polysaccharide in the solution may vary over a wide range. The solvent, temperature of the mixture, and the concentration of the polysaccharide are preferably selected such that the polysaccharide and oxidation products thereof are substantially dissolved in the solvent during the oxidation step. Without intending to be limited by theory, it is believed that the oxidizing agent may not efficiently access the polysaccharide when it is present in solid form, with a resultant reduction in yield of the aldehyde functionalized polysaccharide. Room temperature (20°–25° C.) is typically sufficient for dissolution.

Water is the preferred solvent for the oxidation reaction. Typically, the liquid mixture contains up to about 10 weight % of the polysaccharide and at least about 90 weight % water, preferably from about 0.25 to about 1.0 weight % of the polysaccharide and from about 99.25 to about 99.0 weight % water.

The polysaccharide can be substantially dissolved in the medium by any suitable method such as are known in the art. Conventional agitation equipment, e.g., magnetic or mechanical stirrers, are typically used. Dissolution is typically achieved after agitating for a period of about 30 minutes to about 1 hour at a temperature of 25° C. to about 50° C.

The solution is then contacted with ozone to cause oxidation of the polysaccharide to form aldehyde groups on the polysaccharide molecule. Contact of the polysaccharide and the ozone is preferably assisted by the use of an agitation means, e.g., a stirrer.

Ozone oxidation can be accomplished by introducing ozone into the solution, e.g., by injecting the gas under pressure into the solution. Although the flow rate and pressure of the ozone may vary over a wide range, exemplary conditions include a flow rate of about 8.0 liters/minute and a flow pressure of about 8 psig. The solution is preferably cooled to a temperature as low as possible without freezing the mixture (e.g., to temperatures down to about °C.) in order to maximize the solubility of the ozone in the solution. Antifoaming agents such as are known in the art may be added to the solution to minimize foaming. The oxidation reaction is typically completed by introducing the ozone under the foregoing conditions for a period ranging from about 30 to about 60 minutes. The pH of the solution is preferably adjusted to a pH of from about 2 to about 10, more preferably from about 5.0 to about 8.0, most preferably from about 5.5 to about 6.5, prior to introduction of the oxidizing agent During the oxidation step, at least a portion of the polysaccharide hydroxyl groups are converted to aldehyde groups. Without intending to be bound by theory, it is believed that at least a portion of the cis-hydroxyl groups are converted to aldehyde groups. The resultant solution is clear and colorless.

The resultant polymer is advantageously used in the form of the solution, which may be further diluted with additional solvent or concentrated. Alternatively, the polymer can be isolated and recovered by removing the solvent e.g., by vacuum and/or evaporation. The polymer can then later be used in a temporary wet strength composition and applied to paper products for imparting temporary wet strength thereto. Such compositions comprise the aldehyde functionalized polymer of the present invention, a solvent suitable for substantially dissolving the polymer (preferably water), and optionally other paper making additives such as are known in the art (e.g., softeners, retention aids).

The aldehyde functionalized polysaccharides of the present invention are useful for imparting temporary wet strength to a wide variety of paper and paper products. As used herein, the terms "paper" and "paper products" include sheet-like masses and molded products containing fibrous cellulosic materials which may be derived from natural sources, such as wood pulp fibers. Cellulosic fibers of diverse natural origin are applicable to the invention. Digested fibers from softwood (derived from coniferous trees), hardwood (derived from both deciduous trees) or cotton linters are preferably utilized. Fibers from Esparto grass, bagasse, kemp, flax, and other lignaceous and cellulosic fiber sources may also be utilized as raw material in the invention. The optimum cellulosic fiber source utilized in conjunction with this invention will depend upon the particular end use contemplated. Generally wood pulps will be utilized. Applicable wood pulps include chemical pulps, such as Kraft (i.e., sulfate) and sulfite pulps as well as mechanical pulps including, for example, groundwood, thermomechanical pulp (i.e., TMP) and chemithermomechanical pulp (i.e., CTMP). Chemical pulps, however, are preferred since they impart a superior tactile sense of softness to tissue sheets made therefrom. Completely bleached, partially bleached and unbleached fibers are applicable. It may frequently be desired to utilize bleached pulp for its superior brightness and consumer appeal. For products such as paper tissue, paper towels and absorbent pads for diapers, sanitary napkins, catamenials, and other similar absorbent paper products, it is especially preferred to utilize fibers from northern softwood pulp due to its premium strength characteristics.

Also useful in the present invention are fibers derived from recycled paper, which can contain any or all of the above categories as well as other non-fibrous materials such as fillers and adhesives used to facilitate the original paper making.

The paper products may also contain non-cellulosic fibrous polymeric material characterized by having hydroxyl groups attached to the polymer backbone, for example, glass fibers and synthetic fibers modified with hydroxyl groups. Other fibrous material, e.g., synthetic fibers, such as rayon, polyethylene and polypropylene fibers, can also be utilized in combination with natural cellulosic fibers or other fibers containing hydroxyl groups. Mixtures of any of the foregoing fibers may be used. Since the strength of the paper product tends to increase with the number of hydroxyl groups in the fibers, it will usually be preferred to employ primarily, more preferably wholly, fibers having hydroxyl groups. Cellulosic fibers are economically preferred.

The paper products are typically formed by a wet laid paper making process. Wet laid paper making processes typically include the steps of providing a slurry containing the cellulosic fibers (the slurry is alternatively referred to herein as a paper making furnish), depositing the slurry of fibers on a substrate such as a foraminous forming wire (e.g., a Fourdrinier wire), and setting the fibers into a sheeted form while the fibers are in a substantially unflocculated condition. The step of setting the fibers into sheeted form may be performed by allowing the fluid to drain and pressing the fibers against the foraminous wire (dewatering), for example, with a screened roll, such as a cylindrical Dandy Roll. Once set, the fibrous sheet may then be dried and optionally compacted as desired.

The paper products of the present invention comprise the temporary wet strength additive in combination with cellulosic fibers. The aldehyde functionalized polysaccharide of the present invention is combined with the cellulosic and optionally other fibers in a manner which allows the polymer and fibers to form a bonded fiber mass, generally in the form of a sheet containing the fibers. The bonded fiber mass has a dry strength and an initial wet strength that is higher than a comparable fiber mass without the polymer.

In general, the aldehyde functionalized polysaccharide is combined with the cellulosic fibers by contacting the cellulosic fibers with a solution of the polysaccharide in an aqueous liquid medium and substantially removing the medium from the fibers to react the aldehyde functionalized polysaccharide with the cellulosic fibers such that intercellulosic fiber bonds are formed. Without intending to be bound by theory, it is believed that at least a portion of the aldehyde groups on the polysaccharide react with cellulosic hydroxyl groups to form hemiacetal groups upon drying of the paper product. These hemiacetal groups serve to impart dry strength and an initial wet strength to the paper product, yet are readily decomposed by water. When the paper product is exposed to aqueous fluids, the hemiacetal groups revert back to the aldehyde groups and the hydroxyl groups to provide a temporary wet strength to the paper product.

The aldehyde functionalized polysaccharide may be combined with the fibers in the wet end of a paper making process or after the paper product is substantially formed. In a preferred embodiment, the polysaccharide is combined with the fibers after the paper product is substantially formed, e.g., by spraying or printing.

Thus, treatment of the paper or paper products with the temporary wet strength polymer of this invention may involve spraying, printing or otherwise applying the polymer to the cellulosic fibers that have been substantially set in the preparation of the paper product, e.g., by a wet laid process. The set fibers are preferably sprayed or printed with the temporary wet strength polymer in the form of a temporary wet strength composition which comprises a liquid mixture of the polymer substantially dissolved in a suitable solvent. Water is the preferred solvent. The liquid mixture typically contains from about 1–10 weight % of the polymer and about 90–99 weight % of the solvent, for example, a mixture of about 5 weight % of the polymer and about 95 weight % of the solvent, is suitable.

Alternatively, the temporary wet strength polymer is combined with the cellulosic fibers in the wet-end of a wet laid paper-making process. Thus, the temporary wet strength polymer may suitably be included in the paper-making furnish. The polymer may be directly added to the furnish and agitated to cause its dissolution. Alternatively, a solution of the polymer is first prepared and then added to the furnish.

In a preferred embodiment, treatment is accomplished by spraying, printing or otherwise applying the polymer to the set fibers with such a composition (more preferably spraying). Spraying tends to provide higher levels of initial total wet tensile strength relative to treatment via the wet end in a handsheet paper making process.

The amount of temporary wet strength polymer that is combined with the cellulosic fibers is generally selected to provide a balance of initial wet strength, wet tensile decay, and optionally other properties, including dry strength, consistent with the objects of the invention. In general, with increasing amounts of the polymer there is an increase in dry strength and initial wet tensile strength and a decrease in the rate of wet strength decay. The paper products will typically contain from about from about 1% to about 10%, preferably about 0.5 to about 5 weight %, more preferably from about 0.5 weight % to about 2 weight % of the polymer, based on the weight of the cellulosic fibers and optionally other fibers containing hydroxyl groups.

The temporary wet strength polymer is allowed to remain in contact with the cellulose fibers for a time and at a temperature sufficient to enable adsorption of the polymer by the fibers and bonding between the polymer and fibers such that significant wet strength is developed via the bond formation (interfiber bonds are formed). When the cellulosic fibers are treated by spray application on conventional commercial paper making equipment, the production time, e.g., the paper air-drying time (conventionally less than 4 minutes), may need to be increased to enable significant levels of wet strength to develop.

Bonding may involve ionic bonding and/or covalent bonding. The cellulosic fibers and the polymer are preferably combined at a pH within the range of about 3 to about 9, preferably of about 7 or less, more preferably from about 4 to about 5. Without intending to be bound or limited by theory, it is believed that acidic pH catalyzes the formation of hemiacetal groups to thereby enhance wet strength development. Therefore, in preferred embodiments the pH of the papermaking furnish or of the temporary wet strength composition is adjusted, if necessary, to a pH within these ranges.

The paper product that is being treated with the temporary wet strength polymer is subjected to a drying step to remove water and/or any other solvents so as to develop the wet strength. Drying may be accomplished by subjecting the paper product to elevated temperatures, e.g., in the range of from 85° C.–125° C., for a time sufficient to achieve the desired level of dryness, typically to constant weight. Typical conditions are a temperature of from 20° C. to about 100° C. and a contact time of from about 60 minutes to about 5 minutes. For example, a period of about 5 minutes at 50° C. provides a product having preferred initial and 30 minute wet tensile values.

Without intending to be bound or otherwise limited by theory, it is believed that the aldehyde groups of the temporary wet strength polymer bond to the cellulosic fibers by formation of hemi-acetal groups through reaction of at least a portion of the cellulosic hydroxyl groups and at least a portion of the aldehyde groups as the paper product dries. The resultant network tends to have a relatively high initial wet tensile strength. The hemiacetal linkages are reversible in water, slowly reverting to the original temporary wet strength polymer. This reversibility confers temporary wet strength to the paper product.

In order to develop wet tensile strength, it is important that the paper product drying rate be slow enough to enable interfiber bond formation between the aldehyde functionalized polysaccharide and the cellulosic fibers of the paper product. For example, spray application of the aldehyde functionalized polysaccharide onto tissue followed by air drying for a period of from 15–60 minutes prior to oven curing and creping is sufficient for such interfiber bond formation to occur.

The paper product may further contain conventional paper-making additives such as are known in the art, e.g., retention aids and paper softeners. In a preferred embodiment of the invention, the paper product is treated with a cationic retention aid to decrease the charge repulsion between the temporary wet strength polymer and the cellulose fibers. Fibers treated in this manner tend to have more and stronger interfiber bonds, which serve to provide higher initial wet tensile strengths. The retention aid can be added to the temporary wet strength composition to be applied to the fibers (e.g., as a spray, print mixture, or in the furnish). Suitable cationic retention aids and their use in paper making applications are well known in the art. Exemplary cationic retention aids include Acco 711 and Cypro 514 (American Cyanamid Corp. of Wayne, N.J.), and Reten 201 (Hercules Inc. of Wilmington, Del.). The retention aid is typically used in an amount of 1–10%, preferably about 1–5%, based on the weight of the aldehyde functionalized polysaccharide.

The present invention is particularly adapted for paper products which are to be disposed into sewer systems, such as toilet tissue. However, it is to be understood that the present invention is applicable to a variety of paper products including, but not limited to disposable absorbent paper products such as those used for household, body, or other cleaning applications and those used for the absorption of body fluids such as urine and menses. Exemplary paper products thus include tissue paper including toilet tissue and facial tissue, paper towels, absorbent materials for diapers, feminine hygiene articles including sanitary napkins, pantiliners and tampons, adult incontinent articles and the like, and writing paper.

With regard to paper tissue, the temporary wet strength polymers of the present invention can be used in any type of tissue paper construction. For example, tissue paper of the present invention can be homogeneous or multi-layered construction; and tissue paper products made therefrom can be of a single-ply or multi-ply construction. The tissue paper preferably has a basis weight of between about 10 g/m$^2$ and about 65 g/m$^2$, and density of about 0.6 g/cm$^3$ or less. More preferably, the basis weight will be about 40 g/m$^2$ or less and the density will be about 0.3 g/cm³ or less. Most preferably, the density will be between about 0.04 g/cm³ and about 0.2 g/cm³. See Column 13, lines 61–67, of U.S. Pat. No. 5,059,282 (Ampulski et al), issued Oct. 22, 1991, which describes how the density of tissue paper is measured. (Unless otherwise specified, all amounts and weights relative to the paper are on a dry basis.) The tissue paper may be conventionally pressed tissue paper, pattern densified tissue paper, and uncompacted, nonpattern-densified tissue paper. These types of tissue paper and methods for making such paper are well known in the art and are described, for example, in U.S. Pat. No. 5,334,286, issued on Aug. 2, 1994 in the names of Dean V. Phan and Paul D. Trokhan, incorporated herein by reference in its entirety.

With respect to paper products that are to be used in the moistened condition, and with particular reference to tissue paper products including toilet paper to be used in the moistened condition for body cleaning or other purposes, it is preferred that the product have an initial wet tensile strength that is high enough for it to withstand the stresses encountered in use. Preferably, the paper product has an initial wet tensile strength of at least about 80 g/inch, more preferably at least about 120 g/inch.

Moreover, it is desirable for tissue paper products to exhibit a wet strength decay rate such that it can be flushed without a significant risk of sewer system clogging. Preferred products have a total wet tensile strength after 30 minutes of soaking in neutral pH water of less than about 40 g/in, preferably less than about 20 g/inch. Flushable paper products may exhibit a wet strength decay rate after 30 minutes of soaking in neutral pH water of at least about 70%, preferably at least about 80%.

In addition, with respect to tissue paper products, and with particular reference to products such as toilet paper, wherein high levels of softness are desired in addition to good initial wet tensile strength with wet strength decay after the period of usage to low strength levels, it is highly preferred for the paper to have an initial total wet tensile strength/total dry tensile strength of at least about 10%, preferably at least about 12%. Lower ratios are less desirable since they tend to be accompanied by a harsh tactile impression. However, paper softening agents may be used to provide greater softness as may be desired.

Paper tissue products formed with the temporary wet strength polymers of the present invention tend to have a high initial total wet tensile strength, a suitable initial total wet strength/dry strength ratio, and a wet strength decay rate suitable for flushability without a significant risk of sewer system clogging under normal use conditions. The aforementioned tensile properties may be determined as described in the following experimental section.

EXPERIMENTAL

Strength Tests

The paper products are aged prior to tensile testing a minimum of 24 hours in a conditioned room where the temperature is 73° F.±4° F. (22.8° C.±2.2° C.) and the relative humidity is 50%±10%.

1. Total Dry Tensile Strength ("TDT")

This test is performed on one inch by five inch (about 2.5 cm×12.7 cm) strips of paper (including creped tissue paper, handsheets, as well as other paper sheets) in a conditioned room where the temperature is 73° F.±4° F. (about 28° C. ±2.2° C.) and the relative humidity is 50%±10%. An electronic tensile tester (Model 1122, Instron Corp., Canton, Mass.) is used and operated at a crosshead speed of 2.0 inches per minute (about 5.2 cm per min.) and a gauge length of 4.0 inches (about 10.2 cm). Reference to a machine direction means that the sample being tested is prepared such that the 5" dimension corresponds to that direction. Thus, for a machine direction (MD) TDT, the strips are cut such that the 5" dimension is parallel to the machine direction of manufacture of the paper product. For a cross machine direction (CD) TDT, the strips are cut such that the 5" dimension is parallel to the cross-machine direction of manufacture of the paper product. Machine-direction and cross-machine directions of manufacture are well known terms in the art of paper-making.

The MD and CD tensile strengths are determined using the above equipment and calculations in the conventional manner. The reported value is the arithmetic average of at least eight strips tested for each directional strength. The TDT is the arithmetic total of the MD and CD tensile strengths.

2. Wet Tensile

An electronic tensile tester (Model 1122, Instron Corp.) is used and operated at a crosshead speed of 0.5 inch (about 1.3 cm) per minute and a gauge length of 1.0 inch (about 2.5 cm), using the same size strips as for TDT. The two ends of the strip are placed in the jaws of the machine such and the center of the strip is placed around a stainless steel peg. The strip is soaked in distilled water at about 20° C. for the desired soak time, and then measured for tensile strength. As in the case of the TDT, reference to a machine direction means that the sample being tested is prepared such that the 5" dimension corresponds to that direction.

The MD and CD wet tensile strengths are determined using the above equipment and calculations in the conventional manner. The reported value is the arithmetic average of at least eight strips tested for each directional strength. The total wet tensile strength for a given soak time is the arithmetic total of the MD and CD tensile strengths for that soak time. Initial total wet tensile strength ("ITWT") is measured when the paper has been saturated for 5±0.5 seconds. 30 minute total wet tensile ("30 MTWT") is measured when the paper has been saturated for 30±0.5 minutes.

3. Wet tensile strength decay rate is defined according to the following equation:

% Decay=[($ITWT-30MTWT$ of paper including the temporary wet strength polymer of the invention)×100] divided by: ($ITWT-30MTWT$ of comparable paper without any strength additive)

The following non-limiting examples are provided to illustrate the present invention. The scope of the invention is to be determined by the claims which follow.

EXAMPLE 1

This example illustrates the preparation of a temporary wet strength additive and paper tissue product according to the present invention. The additive is the oxidation product of guar gum having a molecular weight of from about 500,000–600,000 g/mole, commercially available from Sigma Chemical Company.

30 grams of guar gum is completely dissolved in 2,970 grams of water by stirring at room temperature for 1 hour. The solution has a pH of from 6–8. Ozone is then bubbled through the resultant solution with vigorous stirring for 1 hour to cause oxidation of the guar gum. A Polymetrics Model T-816 ozone generator, available from Polymetrics of California is used to introduce the ozone into the solution. The generator is run on oxygen feed with a gauge setting of 8 psig, an oxygen flow rate of 8.0 l/min, and a voltage of 115 volts. An ice bath is used to cool and maintain the solution at a temperature of 15° to 20° C. during the oxidation period. The resultant solution has a pH of 4.2. The viscosity of the mixture is significantly reduced following the oxidation reaction.

The resultant solution is sprayed onto paper tissue at 2 weight % on fiber basis using a Badger Air Brush Sprayer. The tissue is 18 lb/3000 ft$^2$ wet laid paper tissue sheets consisting primarily of Northern softwood kraft and Brazilian eucalyptus kraft (1:4 by weight) not containing any other wet strength additives. The sprayed sheets are air dried at room temperature for about 60 minutes, then oven cured for 5 minutes at 105° C., and then subjected to calendering (compressive creping) prior to determining the initial total wet tensile (ITWT). The treated paper tissue sheets have an exemplary initial total wet tensile strength of 225 gm/in and 30 minute total wet tensile strength of less than 30 gm/in. In comparison, untreated paper tissue samples provide an exemplary initial total wet tensile strength of <20 gm/in and essentially no wet strength after 30 minutes immersion in neutral distilled water.

When combined with similar tissue paper in the wet end of a handsheet paper making process, this wet strength additive tends not to produce significant levels of initial total wet tensile strength, with or without the inclusion of a cationic retention aid in the furnish. In addition, when the additive is spray applied on conventional commercial paper making equipment run at conventional commercial production rates (affording a paper air-drying time of less than 4 minutes), significant levels of wet strength tend not to result.

EXAMPLE 2

The following illustrates the effect of pH during the oxidation of guar gum on the development of initial total wet tensile strength. The paper that is treated is the same as described in Example 1. All samples are sprayed at 2 weight % on fiber basis with a solution of the oxidized guar gum at a pH of from 4–4.5. The sprayed sheets are air dried at room temperature for 60 minutes, oven cured for 5 minutes at 105° C., and subjected to calendering (compressive creping) prior to determining the initial total wet tensile (ITWT). The paper products have exemplary tensile properties as shown in Table 1.

EXAMPLE 3

Cationic guar gum is ozone oxidized in the manner described for Example 1. Paper tissue as described in Example 1 is treated in the same manner as described in Example 1. The treated tissue paper has an exemplary initial total wet tensile strength of 73 gm/in and 30 minute total wet tensile strength of less than 30 gm/in.

COMPARATIVE EXAMPLE 1

This example and Comparative Example 2 illustrate the effect of the polysaccharide molecular structure on the development of initial total wet tensile.

CoBond 1000, a cationic starch with a number average molecular weight of approximately 90,000,000 grams/mole that contains synthetically attached aldehyde functional groups, is applied in the wet end of a commercial paper making process by spraying at a 2% weight basis (40 lb/ton, as in Example 1). The resultant paper product has an exemplary initial total wet tensile strength of 817 gm/in and 30 minute total wet tensile of >500 gm/in. Paper tissues having the wet tensile properties shown in Table 1 are much more suitable as temporary wet strength tissue than Comparative Example 1.

COMPARATIVE EXAMPLE 2

A solution of CoBond 1000 is ozone oxidized in the same manner as the guar gum in Example 1. The resultant solution containing the ozone oxidized CoBond 1000 is sprayed onto paper as described in Example 1, at a pH of 4–4.5, at 1 weight % on fiber basis, to provide tissue having an exemplary total initial wet tensile of 35 gm/in. This level of initial total wet strength is not useful for a temporary wet strength tissue.

COMPARATIVE EXAMPLE 3

This illustrates the effect of the type oxidizing agent on initial total wet tensile strength.

A 1 gm sample of guar gum is dissolved in 99 ml distilled water and subjected to ozone oxidation (1.0 l/min flow rate @ 11 lb gauge pressure) bubbling through the solution for 30 minutes at ambient temperature. The resultant product is applied to 18 lb/3000 ft$^2$ basis weight tissue (80% eucalyptus/20% northern softwood kraft fiber) at a pH

TABLE 1

| Initial Oxidation pH | Initial Viscosity (cp) | Final Oxidation pH | Final Viscosity (cp) | ITWT (gm/in) | 30 min. TWT (gm/in) |
|---|---|---|---|---|---|
| 12 | 10930 | 7.78 | 50 | 13 | — |
| 10 | 8370 | 4.18 | 20 | 106 | — |
| 8 | 10720 | 4.13 | 20 | 177 | — |
| As prepared (6.1) | 10730 | 4.11 | 60 | 217 | — |
| 6 | 7600 | 3.91 | 44 | 191 | 36 |
| 4 | 10380 | 3.39 | 30 | 123 | — |
| 2 | 10200 | 2.21 | 44 | 161 | — |

Table 1 shows that oxidations at pH from 2–10 provide significant levels of wet tensile strength to the paper product. The optimum pH for the oxidation, in regard to maximum initial total wet strength, is approximately 6. Table 1 also shows that oxidation at a pH of 12 confers no wet tensile strength to the paper.

4–4.5, at a 2% weight basis, allowed to air dry to constant weight and oven dried for 5 minutes at 105° C.

For comparison, a 1 gm sample of guar gum in distilled water as above is mixed with 1.32 gm sodium periodate in 20 ml water. The mixture is stirred overnight at room temperature. The resultant product is then applied to a tissue sample as described in the immediately previous example.

For further comparison, a 1 gm sample of guar gum is dissolved in distilled water as above and mixed with a 1.22 gm sample of sodium iodate in 20 ml of water. This mixture is subjected to ozone oxidation as described for the aqueous guar gum sample, and the resultant product applied to tissue samples as described above.

The treated tissues have initial wet tensiles such as displayed in Table 2.

TABLE 2

| oxidizing agent | initial total wet strength, g/in |
|---|---|
| ozone | 234 |
| periodate | 153 |
| iodate + ozone | 72 |

As shown by Table 2, guar gum that is oxidized with ozone provides an initial total wet tensile strength that is significantly higher than that provided by guar gum oxidized with periodate and even higher than that provided by a combination of iodate and ozone.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A compound useful for imparting temporary wet strength to paper products, the compound comprising the ozone oxidation product of a polysaccharide derived from a sugar selected from the group consisting of mannose, galactose, allose, altrose, gulose, talose, ribose, lyxose, and combinations thereof; in which the hydroxyl groups in at least a portion of the repeating units of the polysaccharide are cis-hydroxyl groups, the oxidation product comprising aldehyde groups.

2. The compound of claim 1 wherein the polysaccharide is derived from a sugar selected from the group consisting of mannose, galactose, and combinations thereof.

3. The compound of claim 1 wherein the polysaccharide is selected from the group consisting of guar gum, locust bean gum, cationic guar gum, cationic locust bean gum, and combinations thereof.

4. The compound of claim 3 wherein the polysaccharide is guar gum, locust bean gum, or a combination thereof.

5. A paper product comprising cellulosic fibers combined with the compound of claim 1.

6. The paper product of claim 5, comprising from about 98 weight % to about 99 weight % of said compound based on the weight of the cellulosic fibers.

7. The paper product of claim 6 wherein the paper product is combined with a cationic retention aid.

8. A method of making a compound useful for imparting temporary wet strength to paper products, the method comprising the steps of:

(a) providing a solution of (i) a polysaccharide in which the hydroxyl groups in at least a portion of the repeating units of the polysaccharide are cis-hydroxyl groups, and (ii) an aqueous liquid medium;

(b) introducing ozone into said solution to form a mixture comprising ozone, said polysaccharide and said medium; and (c) reacting the ozone with at least a portion of the hydroxyl groups of the polysaccharide to form aldehyde groups.

9. The method of claim 8 wherein the mixture of step (b) has an initial pH of up to about 8.

10. The method of claim 9 wherein the mixture of step (b) has an initial pH of from about 5.5 to about 6.5.

11. A method of making a paper product comprising cellulosic fibers combined with a compound useful for imparting temporary wet strength to paper products, the compound comprising the oxidation product of a polysaccharide in which the hydroxyl groups in at least a portion of the repeating units of the polysaccharide are cis-hydroxyl groups, the oxidation product comprising aldehyde groups; the method comprising the steps of:

(a) providing (i) cellulosic fibers and (ii) a solution of the compound of claim 1 and an aqueous liquid medium;

(b) contacting said cellulosic fibers with said solution; and (c) substantially removing said medium from said fibers to react at least a portion of the aldehyde groups of said compound with at least a portion of the cellulosic hydroxyl groups.

12. The method of claim 11 further comprising the step of forming said cellulosic fibers into a web before said step (c) of substantially removing said medium.

13. The method of claim 12 wherein said step of forming said cellulosic fibers into said web is performed before said step (b) of contacting said cellulosic fibers with said solution.

14. The method of claim 11 wherein said solution has a pH of less than about 7.

* * * * *

UNITED STATES PATENT AND TRADEMARK OFFICE
CERTIFICATE OF CORRECTION

PATENT NO.   :   5,760,212
DATED        :   June 2, 1998
INVENTOR(S)  :   David Jay Smith It is certified that error appears in the above-identified patent and that said Letters Patent is hereby corrected as shown below:

Title page, FOREIGN PATENT DOCUMENTS, "0 175 13 A2" should read -- 0 175 113 A2 --.

Column 3, line 20, "altrose", first occurrence, should read -- allose --.

Column 4, line 27, "stiffer." should read -- stirrer. --.

Column 5, line 18, "agent" should read -- agent. --.

Column 5, line 27, "solvent" should read -- solvent, --.

Column 5, line 28, "solvent" should read -- solvent, --.

Signed and Sealed this

Twenty-eighth Day of September, 1999

*Attest:*

Q. TODD DICKINSON

*Attesting Officer*          *Acting Commissioner of Patents and Trademarks*